United States Patent
Lavreka et al.

(10) Patent No.: US 11,941,166 B2
(45) Date of Patent: *Mar. 26, 2024

(54) BODY UI FOR AUGMENTED REALITY COMPONENTS

(71) Applicant: Snap Inc., Santa Monica, CA (US)

(72) Inventors: Mykhailo Lavreka, Marina Del Rey, CA (US); Yurii Husiev, Culver City, CA (US); Denys Poluyanov, Culver City, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,934

(22) Filed: Nov. 9, 2022

(65) Prior Publication Data
US 2023/0063653 A1   Mar. 2, 2023

Related U.S. Application Data

(63) Continuation of application No. 17/248,876, filed on Feb. 11, 2021, now Pat. No. 11,500,454.
(Continued)

(51) Int. Cl.
*G06F 3/01* (2006.01)
*G06F 3/0484* (2022.01)
(Continued)

(52) U.S. Cl.
CPC ............ *G06F 3/011* (2013.01); *G06F 3/0484* (2013.01); *G06V 20/10* (2022.01); *G06V 40/103* (2022.01); *H04L 51/046* (2013.01)

(58) Field of Classification Search
CPC ....... G06F 3/011; G06F 3/0484; H04L 51/046
See application file for complete search history.

(56) References Cited

U.S. PATENT DOCUMENTS

| | | | |
|---|---|---|---|
| 7,971,156 | B2 | 6/2011 | Albertson et al. |
| 7,996,793 | B2 | 8/2011 | Latta et al. |

(Continued)

FOREIGN PATENT DOCUMENTS

| | | |
|---|---|---|
| CN | 103049761 | 8/2016 |
| EP | 3707693 | 9/2020 |

(Continued)

OTHER PUBLICATIONS

"U.S. Appl. No. 17/248,876, Examiner Interview Summary dated Apr. 28, 2022", 2 pgs.
(Continued)

*Primary Examiner* — Ryan F Pitaro
(74) *Attorney, Agent, or Firm* — Schwegman Lundberg & Woessner, P.A.

(57) ABSTRACT

An augmented reality component detects anchor points assigned to respective segments of a person image in output of a digital image sensor of a camera, and displays a user selectable element that can be activated through engagement of an object from the output of the digital image sensor with the user selectable element. The augmented reality component detects engagement of the user selectable element with an object from the person image and, in response, triggers a predetermined action, such as, for example, starting or stopping recording of the output of the digital image sensor or capturing a still image of the output of the digital image sensor.

20 Claims, 17 Drawing Sheets

Related U.S. Application Data

(60) Provisional application No. 63/131,393, filed on Dec. 29, 2020.

(51) Int. Cl.
  G06V 20/10 (2022.01)
  G06V 40/10 (2022.01)
  H04L 51/046 (2022.01)

(56) References Cited

U.S. PATENT DOCUMENTS

| | | | |
|---|---|---|---|
| 8,243,182 B2 | 8/2012 | Petrescu et al. | |
| 8,487,938 B2 | 7/2013 | Latta et al. | |
| 8,856,691 B2 | 10/2014 | Geisner et al. | |
| 9,225,897 B1 | 12/2015 | Sehn et al. | |
| 9,230,160 B1 | 1/2016 | Kanter | |
| 9,276,886 B1 | 3/2016 | Samaranayake | |
| 9,705,831 B2 | 7/2017 | Spiegel | |
| 9,742,713 B2 | 8/2017 | Spiegel et al. | |
| 10,083,524 B1 * | 9/2018 | Malti | G06T 13/40 |
| 10,102,423 B2 | 10/2018 | Shaburov et al. | |
| 10,284,508 B1 | 5/2019 | Allen et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,529,137 B1 | 1/2020 | Black et al. | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,984,575 B2 | 4/2021 | Assouline et al. | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,036,989 B1 | 6/2021 | Assouline et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,500,454 B2 * | 11/2022 | Lavreka | G06F 3/0482 |
| 11,531,402 B1 | 12/2022 | Stolzenberg | |
| 11,546,505 B2 | 1/2023 | Canberk | |
| 2009/0012788 A1 | 1/2009 | Gilbert et al. | |
| 2010/0235786 A1 | 9/2010 | Maizels et al. | |
| 2010/0302393 A1 | 12/2010 | Olsson et al. | |
| 2011/0301934 A1 | 12/2011 | Tardif | |
| 2012/0162476 A1 * | 6/2012 | Onoda | H04N 23/633 |
| | | | 348/E5.031 |
| 2013/0124207 A1 | 5/2013 | Sarin et al. | |
| 2013/0278501 A1 | 10/2013 | Bulzacki | |
| 2013/0329074 A1 | 12/2013 | Zhang et al. | |
| 2014/0171036 A1 | 6/2014 | Simmons | |
| 2015/0120293 A1 | 4/2015 | Wohlert et al. | |
| 2015/0229837 A1 | 8/2015 | Her et al. | |
| 2015/0334292 A1 | 11/2015 | Tartz et al. | |
| 2015/0365590 A1 | 12/2015 | Ishizuka | |
| 2015/0370320 A1 | 12/2015 | Connor | |
| 2016/0150215 A1 | 5/2016 | Chen et al. | |
| 2016/0300374 A1 | 10/2016 | Woo et al. | |
| 2017/0032581 A1 | 2/2017 | Petrucci et al. | |
| 2017/0041523 A1 | 2/2017 | Rifkin et al. | |
| 2017/0123487 A1 | 5/2017 | Hazra et al. | |
| 2017/0277684 A1 | 9/2017 | Dharmarajan Mary | |
| 2017/0277685 A1 | 9/2017 | Takumi | |
| 2017/0351910 A1 | 12/2017 | Elwazer et al. | |
| 2018/0101238 A1 | 4/2018 | Thomas-brigden et al. | |
| 2018/0158370 A1 | 6/2018 | Pryor | |
| 2018/0322680 A1 | 11/2018 | Mcelmurray et al. | |
| 2018/0373330 A1 | 12/2018 | Benford et al. | |
| 2019/0058834 A1 | 2/2019 | Kim et al. | |
| 2019/0087646 A1 | 3/2019 | Goulden et al. | |
| 2019/0146219 A1 | 5/2019 | Rodriguez | |
| 2019/0272675 A1 * | 9/2019 | Wagner | H04N 23/57 |
| 2020/0059596 A1 | 2/2020 | Yoo et al. | |
| 2020/0193649 A1 | 6/2020 | Moon et al. | |
| 2020/0265643 A1 | 8/2020 | Koch et al. | |
| 2020/0267331 A1 | 8/2020 | Liu et al. | |
| 2021/0011612 A1 | 1/2021 | Dancie et al. | |
| 2021/0020142 A1 * | 1/2021 | Ooi | G06F 3/011 |
| 2021/0074016 A1 | 3/2021 | Li et al. | |
| 2021/0096726 A1 | 4/2021 | Faulkner et al. | |
| 2021/0149497 A1 | 5/2021 | Wang et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0279475 A1 | 9/2021 | Tusch et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0083811 A1 | 3/2022 | Shimada et al. | |
| 2022/0188539 A1 | 6/2022 | Chan et al. | |
| 2022/0206563 A1 | 6/2022 | Lavreka et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |

FOREIGN PATENT DOCUMENTS

| | | | | |
|---|---|---|---|---|
| EP | 4172726 A1 | 5/2023 | | |
| EP | 4172730 A1 | 5/2023 | | |
| KR | 20170018930 A * | 9/2008 | | G06F 3/011 |
| KR | 20220158824 A | 12/2022 | | |
| WO | 2016168591 | 10/2016 | | |
| WO | 2019094618 | 5/2019 | | |
| WO | WO-2020047117 A1 | 3/2020 | | |
| WO | WO-2022005687 A1 | 1/2022 | | |
| WO | WO-2022005693 A1 | 1/2022 | | |
| WO | WO-2022060549 A2 | 3/2022 | | |
| WO | WO-2022066578 A1 | 3/2022 | | |
| WO | WO-2022060549 A3 | 4/2022 | | |
| WO | WO-2022132381 A1 | 6/2022 | | |
| WO | WO-2022146678 A1 | 7/2022 | | |
| WO | WO-2022198182 A1 | 9/2022 | | |
| WO | WO-2022216784 A1 | 10/2022 | | |
| WO | WO-2022225761 A1 | 10/2022 | | |
| WO | WO-2022245765 A1 | 11/2022 | | |

OTHER PUBLICATIONS

"U.S. Appl. No. 17/248,876, Non Final Office Action dated Dec. 21, 2021", 16 pgs.

"U.S. Appl. No. 17/248,876, Notice of Allowance dated Jul. 8, 2022", 8 pgs.

"U.S. Appl. No. 17/248,876, Response filed Apr. 21, 2022 to Non Final Office Action dated Dec. 21, 2021", 9 pgs.

"International Application Serial No. PCT/US2021/064201, International Search Report dated Apr. 8, 2022", 4 pgs.

"International Application Serial No. PCT/US2021/064201, Written Opinion dated Apr. 8, 2022", 5 pgs.

* cited by examiner

BODY UI FOR AUGMENTED REALITY COMPONENTS

CLAIM OF PRIORITY

This application is a continuation of U.S. patent application Ser. No. 17/248,876, filed on Feb. 11, 2021, which claims the benefit of priority to U.S. Provisional Application Ser. No. 63/131,393, filed on Dec. 29, 2020, each of which are incorporated herein by reference in their entireties.

TECHNICAL FIELD

The present disclosure relates generally to facilitating interactions between a messaging client and third-party resources.

BACKGROUND

The popularity of computer-implemented programs that permit users to access and interact with content and other users online continues to grow. Various computer-implemented applications exist that permit users to share content with other users through messaging clients. Some of such computer-implemented applications, termed apps, can be designed to run on a mobile device such as a phone, a tablet, or a wearable device, while having a backend service provided on a server computer system to perform operations that may require resources greater than is reasonable to perform at a client device (e.g., storing large amounts of data or performing computationally expensive processing).

A messaging app executing at a client device may provide a user interface (UI) that allows a user to capture a photo or a video of themselves, using a front-facing camera of the client device, and to share the captured content to other devices. The UI provided by a messaging app may include various user selectable elements that can be activated by touching the area of the screen that displays the user selectable element. For example, the UI may include a user selectable element that starts and stops video recording, in response to a tap.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
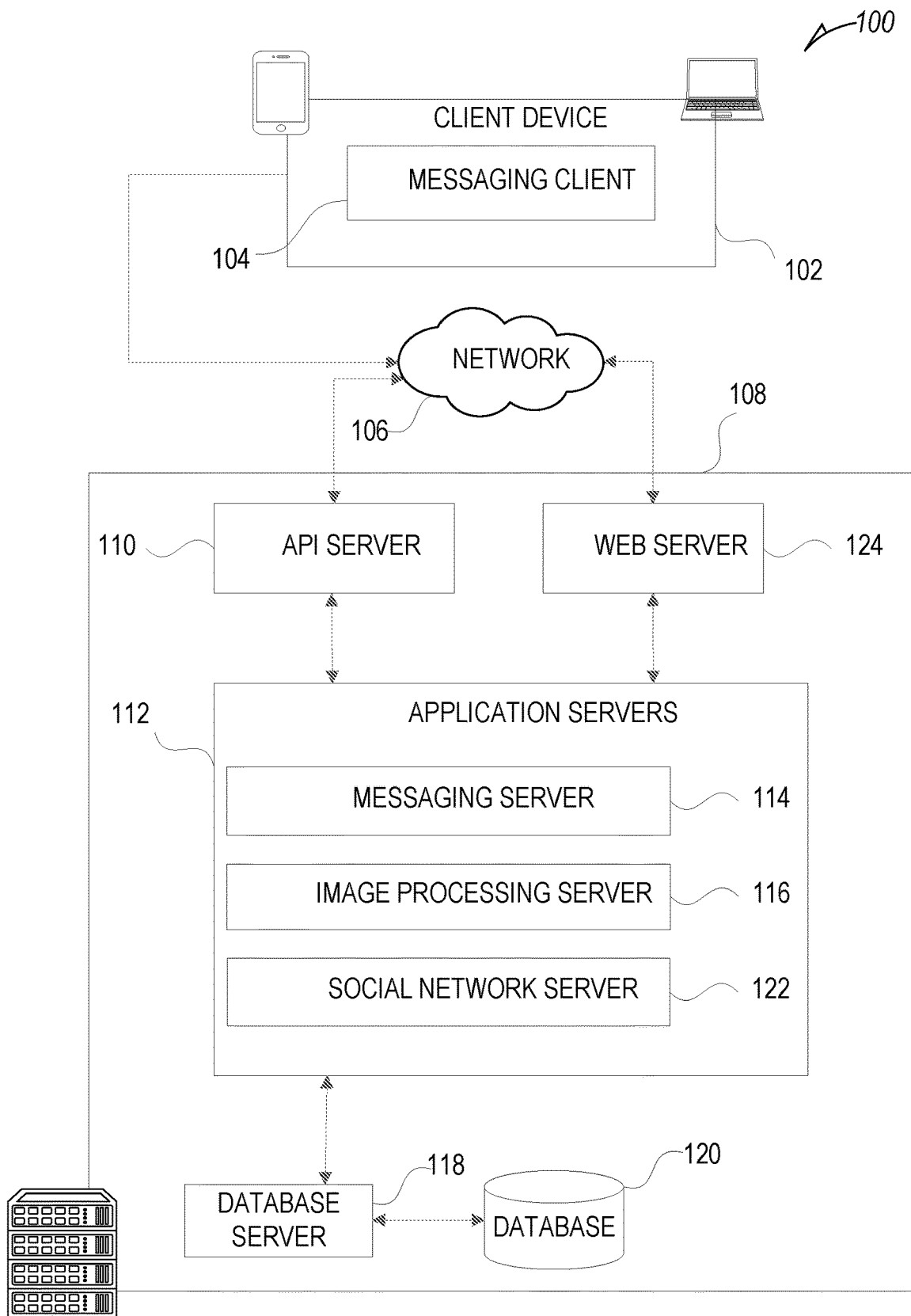
FIG. 1 is a diagrammatic representation of a networked environment in which a developer tools system may be deployed, in accordance with some examples.

Embodiments of the present disclosure improve the functionality of electronic messaging software and systems by enhancing users' experience of engaging with augmented reality (AR) technology. The users' experience of engaging with AR technology is enhanced by permitting users to engage a user selectable element, which is presented on a camera view screen, without physical contact with the screen or with another device. A user selectable element that can be engaged without physical contact with the screen, in a touchless manner, may be used beneficially, especially in scenarios, where a user does not hold the client device (such as a phone), but is some distance away from the device. For instance, a user may wish to be some distance away from the client device in order to take a full body photo of themselves or in order to "try on" various virtual wearable items.

The technical problem of providing user interface (UI) elements that can be activated without physical contact with any specific device is addressed by configuring an AR component to display a UI element (also referred to as a user selectable element) that can be activated (can perform a function) in response to detecting collision of an object from the output of a digital image sensor of a camera with a user selectable element. For the purposes of this description, an AR component configured to display, in a camera view screen, a user selectable element, which can be activated in response to detecting collision of an object from the output of a digital image sensor of a camera with a user selectable element, is referred to as a body UI AR component. One or more UI elements configured to permit touchless operation, by means of detecting collision of an object from the output of a digital image sensor of a camera with a user selectable element are referred to, collectively, as body UI. A UI element configured to permit touchless operation, by means of detecting collision of an object from the output of a digital image sensor of a camera with a user selectable element is referred to as a touchless user selectable element. FIGS. 7-11, which are described further below, illustrate an example process of engaging user selectable elements in a touchless manner in the context of starting and stopping recording of a selfie video. FIGS. 12-15, which are described further below, illustrate an example process of engaging user selectable elements in a touchless manner in the context of "trying on" a virtual wearable item. A body UI comprising touchless user selectable elements is provided in a messaging system that hosts a backend service for an associated messaging client.

A messaging system that hosts a backend service for an associated messaging client is configured to permit users to capture images and videos with a camera provided with a client device that hosts the messaging client and to share the captured content with other users via a network communication. The messaging system is also configured to provide AR components accessible via the messaging client. AR components can be used to modify content displayed on a camera view screen or captured by a camera, e.g., by overlaying pictures or animation on top of the captured image or video frame, or by adding three-dimensional (3D) effects, objects, characters, and transformations. A camera view screen, also referred to as a camera view UI, is displayed by a messaging client and includes the output of a digital image sensor of a camera, a user selectable element actionable to capture an image by the camera or to start and stop video recording, and also can display one or more user selectable elements representing respective AR components An AR component may be implemented using a programming language suitable for app development, such as, e.g., JavaScript or Java. The AR components are identified in the messaging server system by respective AR component identifiers. A user can access functionality provided by an AR component by engaging a user selectable element included in a camera view UI presented by the messaging client. When an AR component is loaded, the output of a digital image sensor of a camera displayed in the camera view UI is augmented with the modification provided by the AR component. For example, an AR component can be configured to detect the head position of the person being captured by the digital image sensor and overlay an image of a party hat over the detected head position, such that the viewer would see the person presented on the camera view screen as wearing the party hat. Loading a body UI AR component comprises commencing monitoring the image of a person in the camera view to determine whether or not the image is of a whole person, a full body image. This determination is made by detecting anchor points assigned to respective segments of a person image in the camera view user interface.

A human body can be represented as a set of anchor points assigned to respective segments of a body, such as skeletal joints, and respective distances between the skeletal joints represented by the anchor points. A set of anchor points representing a person may include anchor points assigned to head, shoulders elbows, wrists, hips, knees and ankles. A set of anchor points representing an image including an object depicting a person can indicate whether the image is of a full body of a person. For example, if an object is associated with a set of anchor points that includes anchor points assigned to head and shoulders, but does not include anchor points representing ankles, knees and hips, it may be inferred that the object represents a head shot of a person. If, on the other hand, an object is associated with a set of anchor points that includes anchor points assigned to head, neck and shoulders, as well as anchor points representing ankles, knees and hips, it may be inferred that the object represents a full body image of a person. For the purposes of this description, an object depicting a person in an image may be referred to as merely a person.

Figure 16:
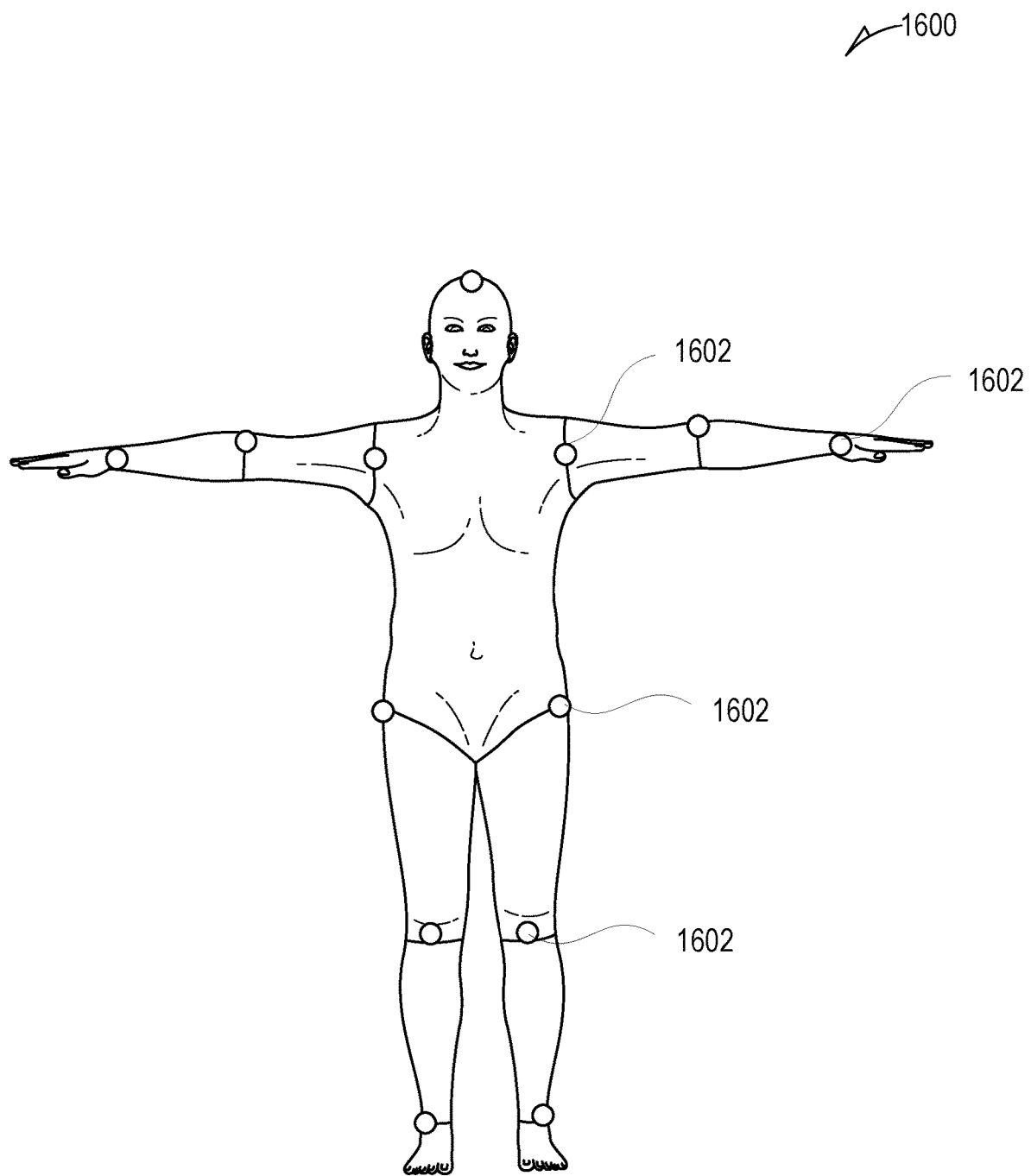
FIG. 16 is a diagrammatic representation of a human body image and anchor points assigned to respective segments of a body, in accordance with some examples.

The system uses one or more machine learning models, such as, for example, neural networks, to detect a person in an image and to determine anchor points assigned to the depicted person. A machine learning model is trained using a training set of images depicting people. In some examples, during training, the machine learning model receives a training image depicting a person, extracts one or more features from a training image and, based on the extracted features, estimates a set of anchor points assigned to the depicted person. The estimated anchor points are compared with the ground truth and, based on a difference threshold of the comparison, the machine learning model updates one or more coefficients and repeats the process using another training image from the training set of images. After a specified number of epochs and/or when the difference threshold reaches a specified value, the machine learning model module completes the training and the parameters and coefficients of the machine learning model are stored. The trained machine learning model takes, as input an image depicting a person and produces a set of anchor points assigned to the depicted person. FIG. 16 is a diagram 1600 of example anchor points 1602 assigned to a depicted person. The anchor points 1602 include anchor points assigned to the head, shoulders, elbows, wrists, hips, knees and ankles of the depicted person. An example body UI AR component may be configured to determine that a depiction of a person is a full body depiction, based on the presence of a set of full body indicator anchor points. A set of anchor points that includes at least the anchor points assigned to the shoulders, hips and knees may be defined as a full body indicator set. A set of anchor points that does not include at least the anchor points assigned to the shoulders, hips and knees is not a full body indicator set.

When a full body image is detected in the camera view screen, the body UI AR component displays, in the camera view UI, a touchless user selectable element. A touchless user selectable element may be placed in the camera view screen in a position relative to the image of a person; for example, the body UI AR may be configured to track movement of the image of a person on the camera view screen and change the position of the touchless user selectable element in a way that it remains within a certain distance from a shoulder object in the image of the person.

The body UI AR component detects collision of the touchless user selectable element with a hand object from the person image and, in response, triggers a predetermined action, such as, for example, starting or stopping recording of the output of a digital image sensor or capturing a still image of the output of a digital image sensor. Content captured by the camera using the body UI AR component can be shared to further computing devices.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data). For example, the messaging client 104 permits a user to access functionality provided by the body UI AR component, which may reside, at least partially, at the messaging server system 108.

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104. For example, the messaging client 104 can present a camera view user interface that displays the output of a digital image sensor of a camera provided with the client device 102, and also to display a user selectable element actionable to load the body UI AR component in the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114. Some of the various image processing operations may be performed by various AR components, which can be hosted or supported by the image processing server 116.

Figure 3:
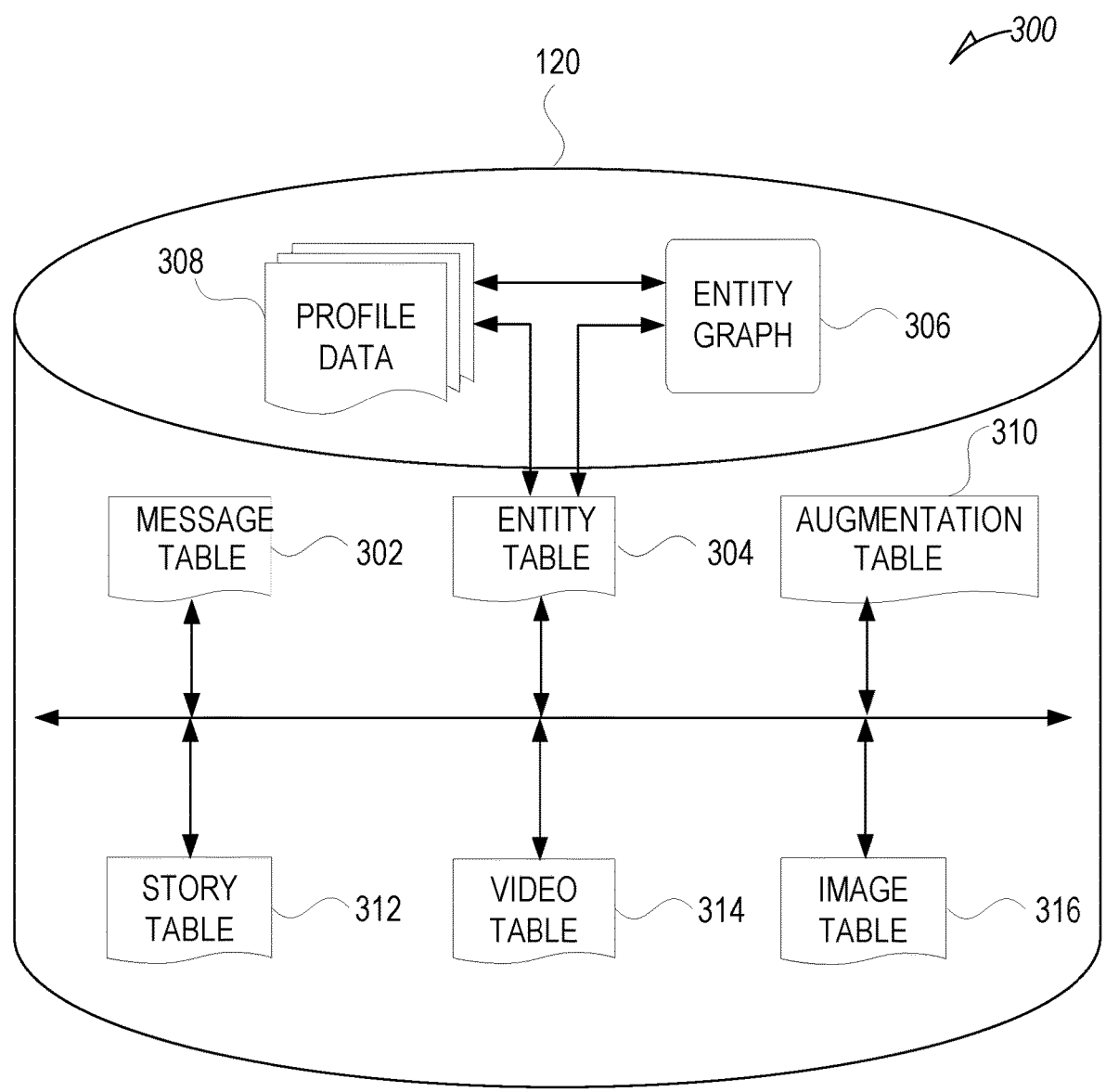
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has a "friend" relationship or is "following," and also the identification of other entities and interests of a particular user.

System Architecture

Figure 2:
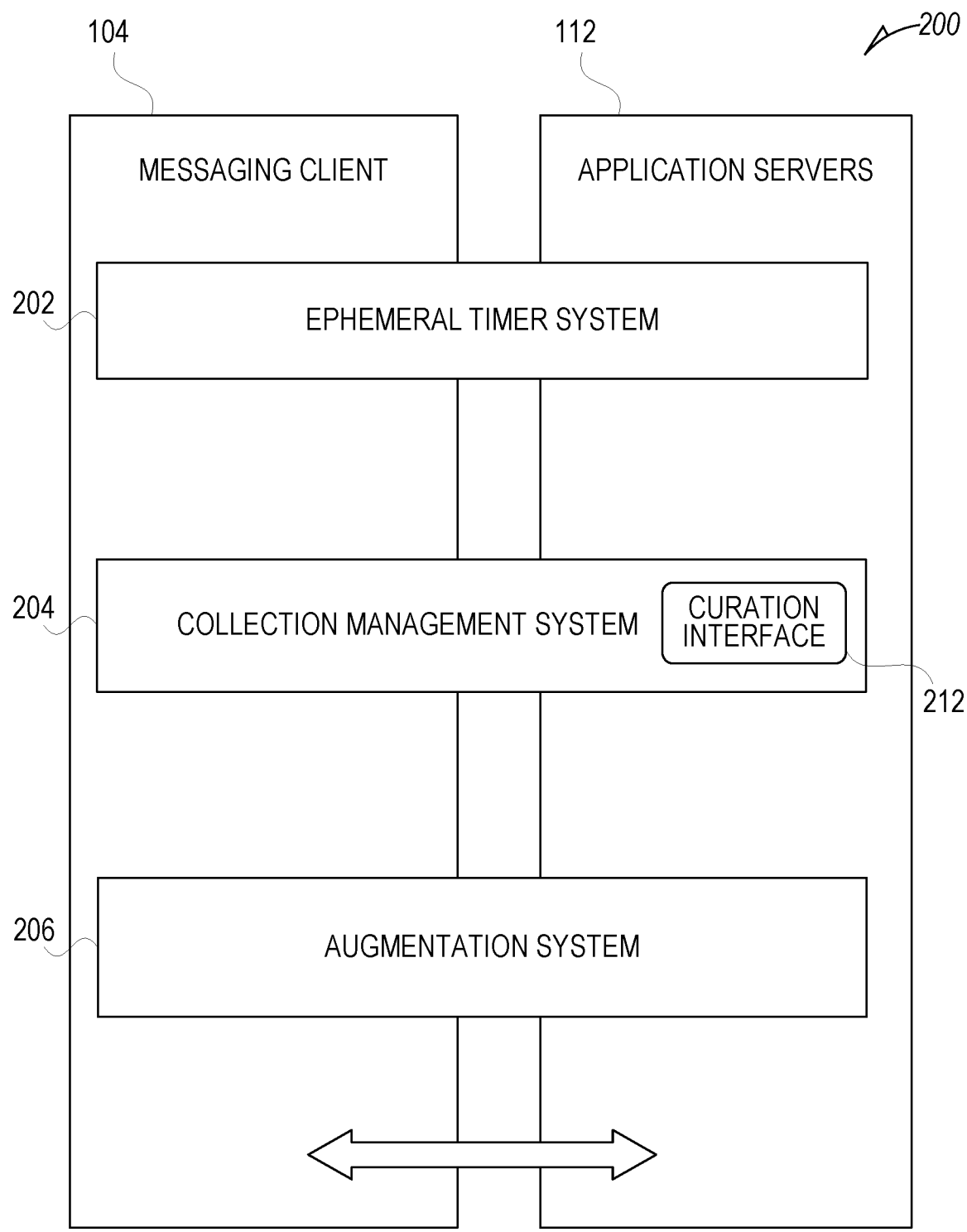
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104, and on the sever-side by the application servers 112. These subsystems include, for example, an ephemeral timer system 202, a collection management system 204, and an augmentation system 206.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. In a further example, a collection may include content, which was generated using one or more AR components, including a body UI AR component. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system 100. The media overlays may be stored in the database 120 and accessed through the database server 118.

In some examples, the augmentation system 206 is configured to provide access to AR components that can be implemented using a programming language suitable for app development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement. A body UI AR component may include, in addition to functionality that permits touchless operation, other AR functionality, such as the functionality described above.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. The payload of a message may include content generated using a body UI AR component. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. With reference to the functionality provided by the AR component, the entity graph 306 stores information that can be used, in cases where the AR component is configured to permit using a portrait image of a user other than that of the user controlling the associated client device for modifying the target media content object, to determine a further profile that is connected to the profile representing the user controlling the associated client device. As mentioned above, the portrait image of a user may be stored in a user profile representing the user in the messaging system.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is a target media content object, which may be associated with an AR component and used to generate an AR experience for a user, as described above.

Another example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications. AR tools may also be used to apply modifications to stored content, such as video clips or still images stored in a gallery. In a client device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a client device 102 would modify the captured data. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. In some examples, the story table 312 stores one or more images or videos that were created using the AR component.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
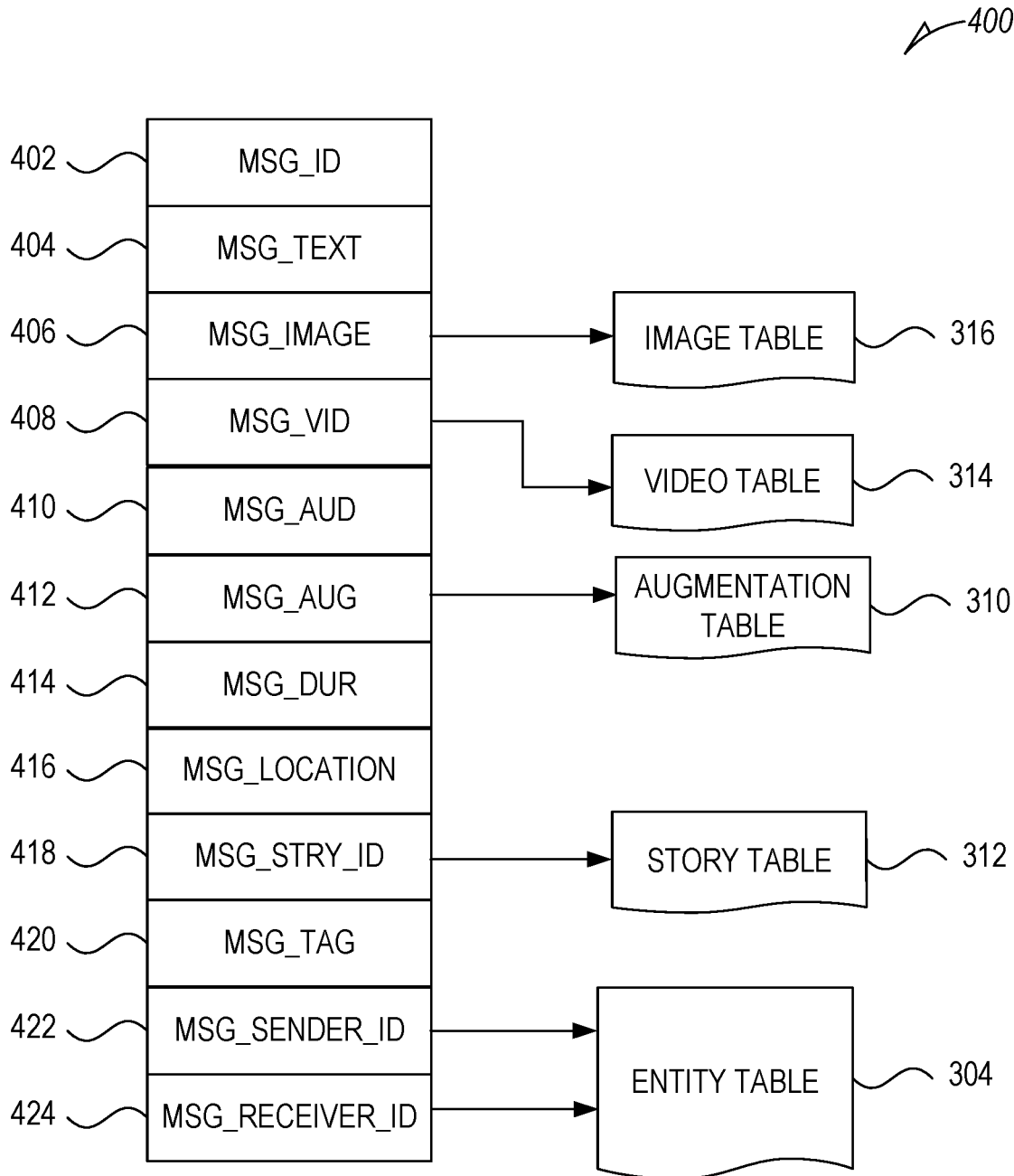
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. The content of a message 400, in some examples, includes an image or a video that was created using the AR component. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
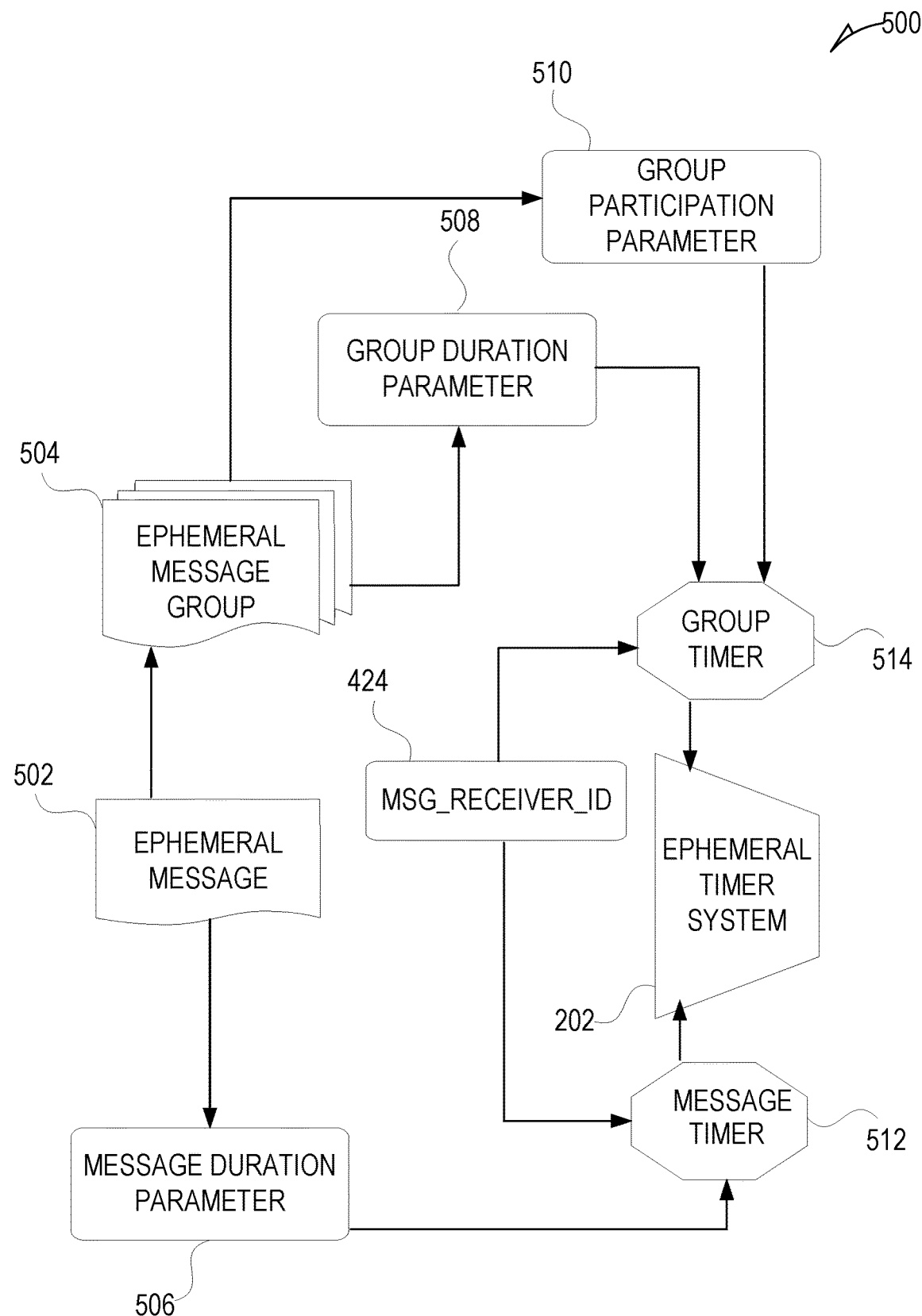
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral). The content of an ephemeral message 502, in some examples, includes an image or a video that was created using a body UI AR component.

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
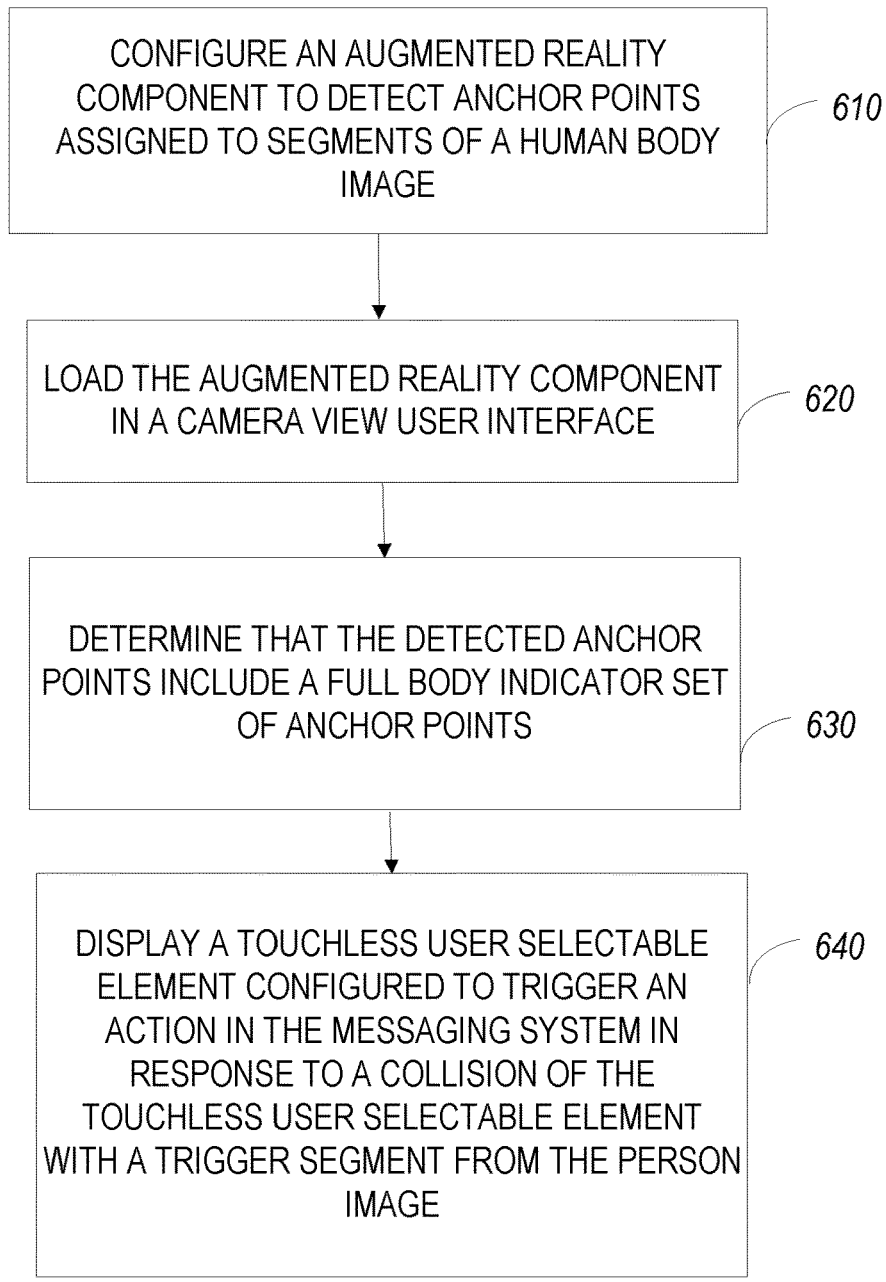
FIG. 6 is a flowchart of a method for enhancing users' experience of engaging with augmented reality (AR) technology, in accordance with some examples.

FIG. 6 is a flowchart of a method 600 for providing an augmented reality experience, in accordance with some examples. In one example embodiment, some or all processing logic resides at the client device 102 of FIG. 1 and/or at the messaging server system 108 of FIG. 1. The method 600 commences at operation 610, when the augmentation system 206 of FIG. 2 configures a body UI AR component to detect anchor points assigned to segments of a human body image. As explained above, a human body can be represented as a set of anchor points assigned to respective segments of a body. A set of anchor points representing a person may include anchor points assigned to head, shoulders elbows, wrists, hips, knees and ankles, as illustrated in FIG. 16. At operation 620, the body UI AR component is loaded in a camera view user interface of the messaging client at a client device. The operation of loading comprises commencing detecting anchor points assigned to respective segments of a person image in the camera view user interface. At operation 630, the loaded body UI AR component determines that the detected anchor points include a full body indicator set of anchor points. A full body indicator set of anchor points may be defined as a set of anchor points that includes at least anchor points assigned to shoulders and hips. As described above, the detecting of the anchor points assigned to respective segments of the person image in the camera view user interface may be achieved by executing a machine learning model trained using a training set of images. The machine learning model, such as a neural network, takes an image of a person as input and produces a set of anchor points as an output. At operation 640, in response to determining that the detected anchor points include a full body indicator set of anchor points, the body UI AR component causes displaying in the camera view user interface a touchless user selectable element configured to trigger an action in the messaging system in response to collision of the touchless user selectable element with a trigger segment from the person image. The action may be taking a photo or commencing recording of a video with the camera of the client device, as well as other actions, such as making a change to or replacing a carousel of selectable user elements. The displaying in the camera view user interface the touchless user selectable element may include tracking position of a body segment object in the person image (such as a shoulder object) and displaying the touchless user selectable element at a location in the camera view user interface determined based on the tracked position of the body segment object.

Figure 7:
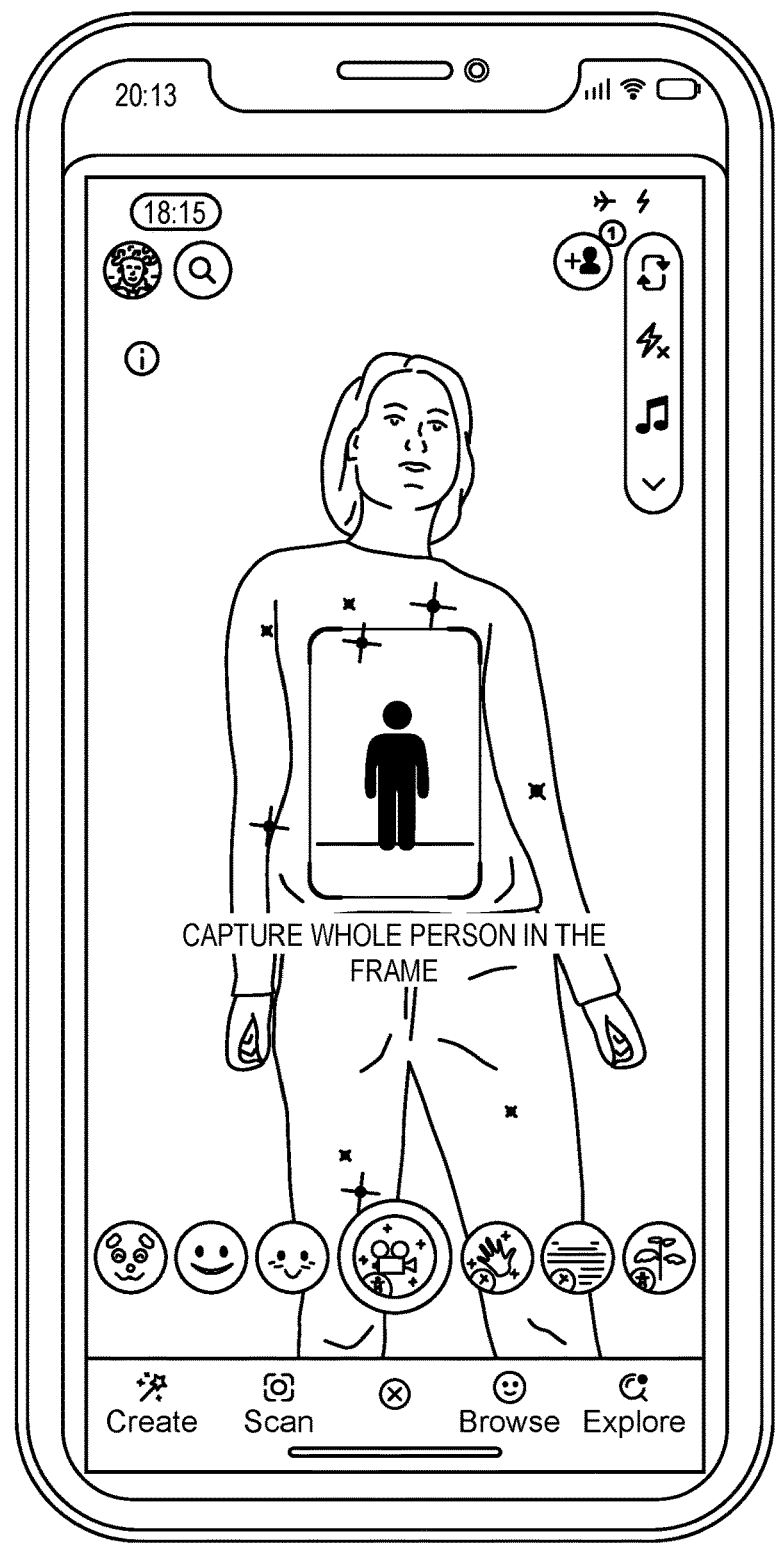
FIG. 7 is a diagrammatic representation of a camera view user interface with a body UI AR component loaded, in accordance with some examples.
Figure 8:
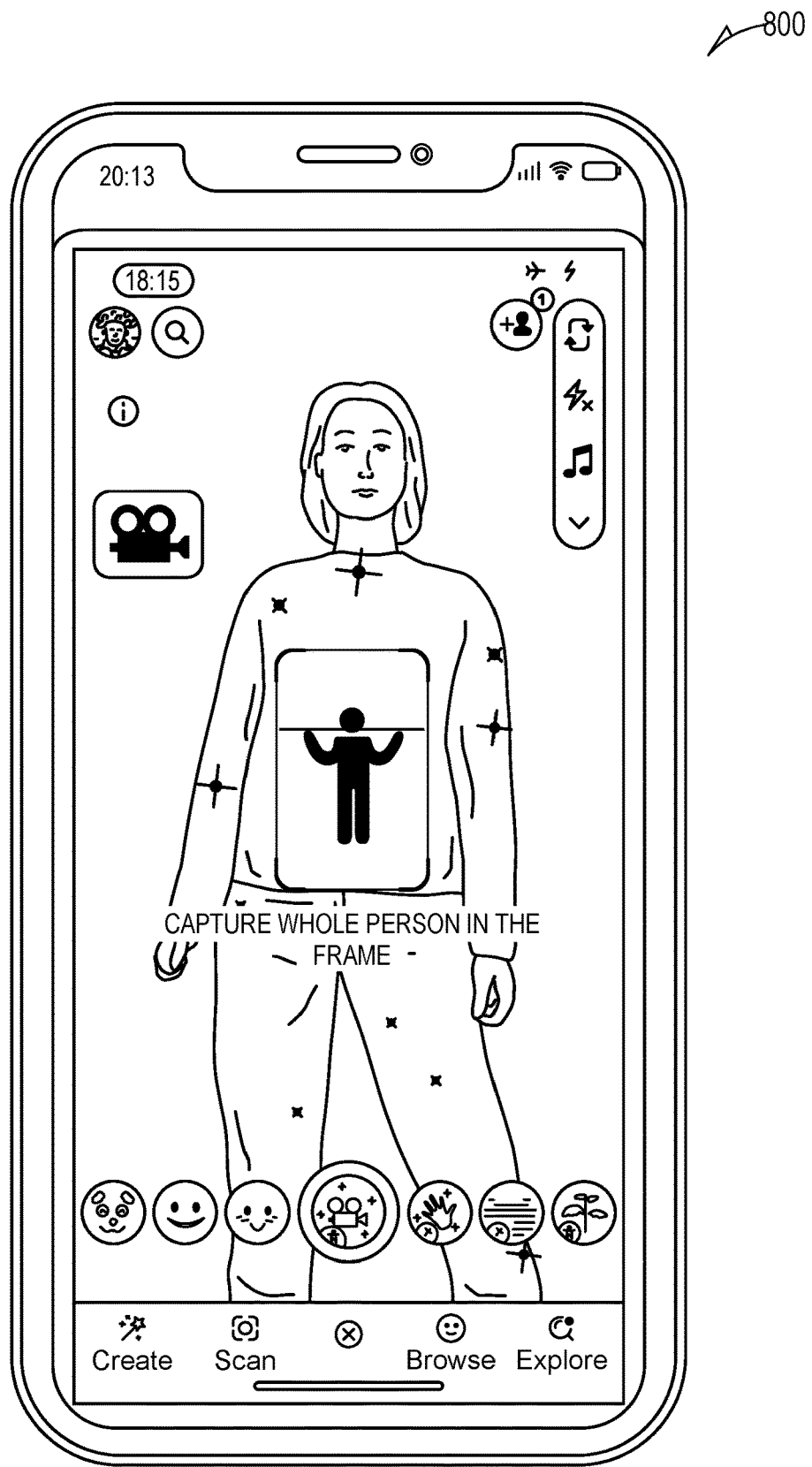
FIG. 8 is a diagrammatic representation of a camera view user interface displaying a touchless user selectable element configured to cause recording of a video, in accordance with some examples.
Figure 9:
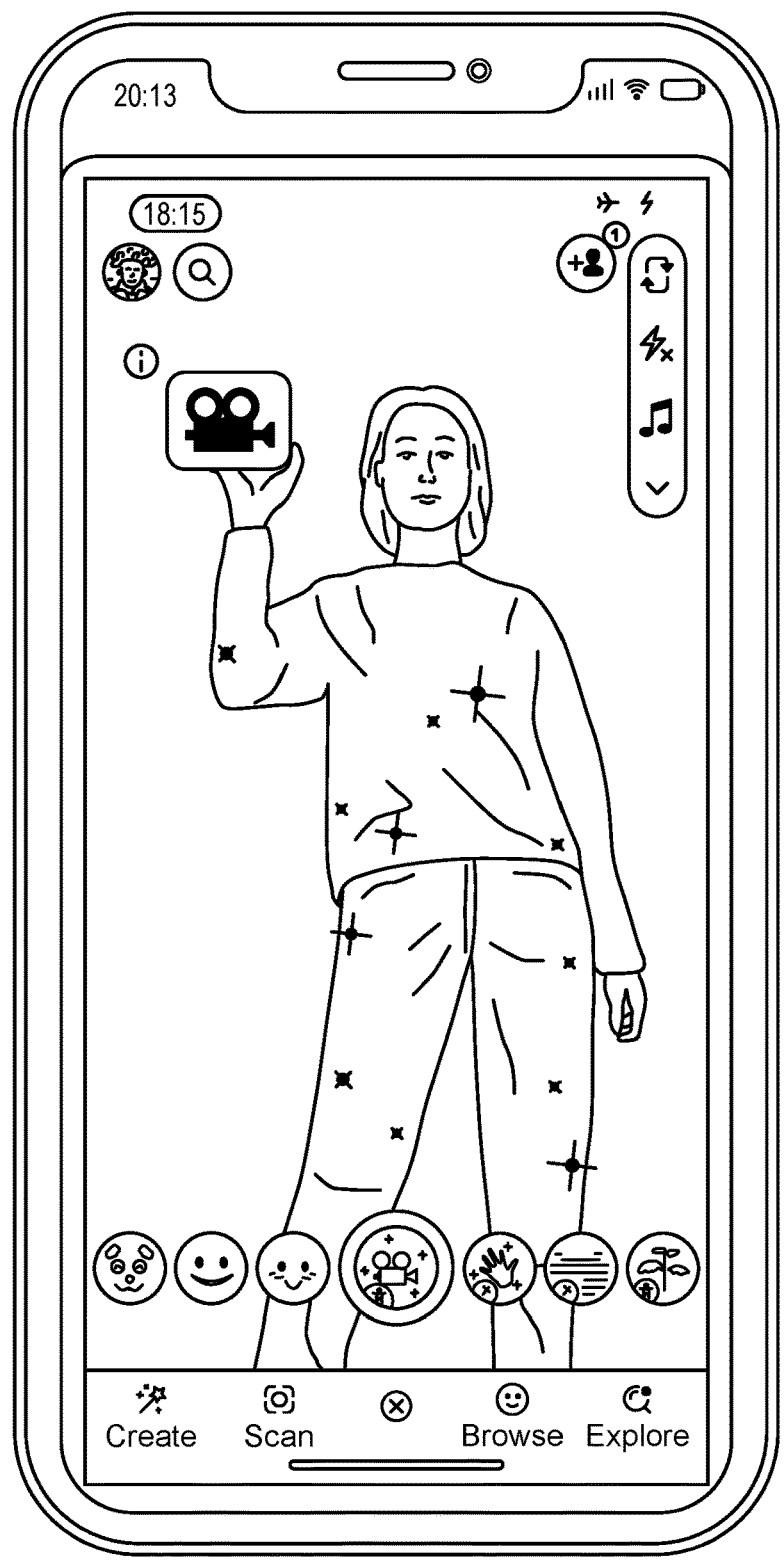
FIG. 9 is a diagrammatic representation of a camera view user interface displaying a collision of a hand object with the touchless user selectable element configured to cause recording of a video, in accordance with some examples.
Figure 10:
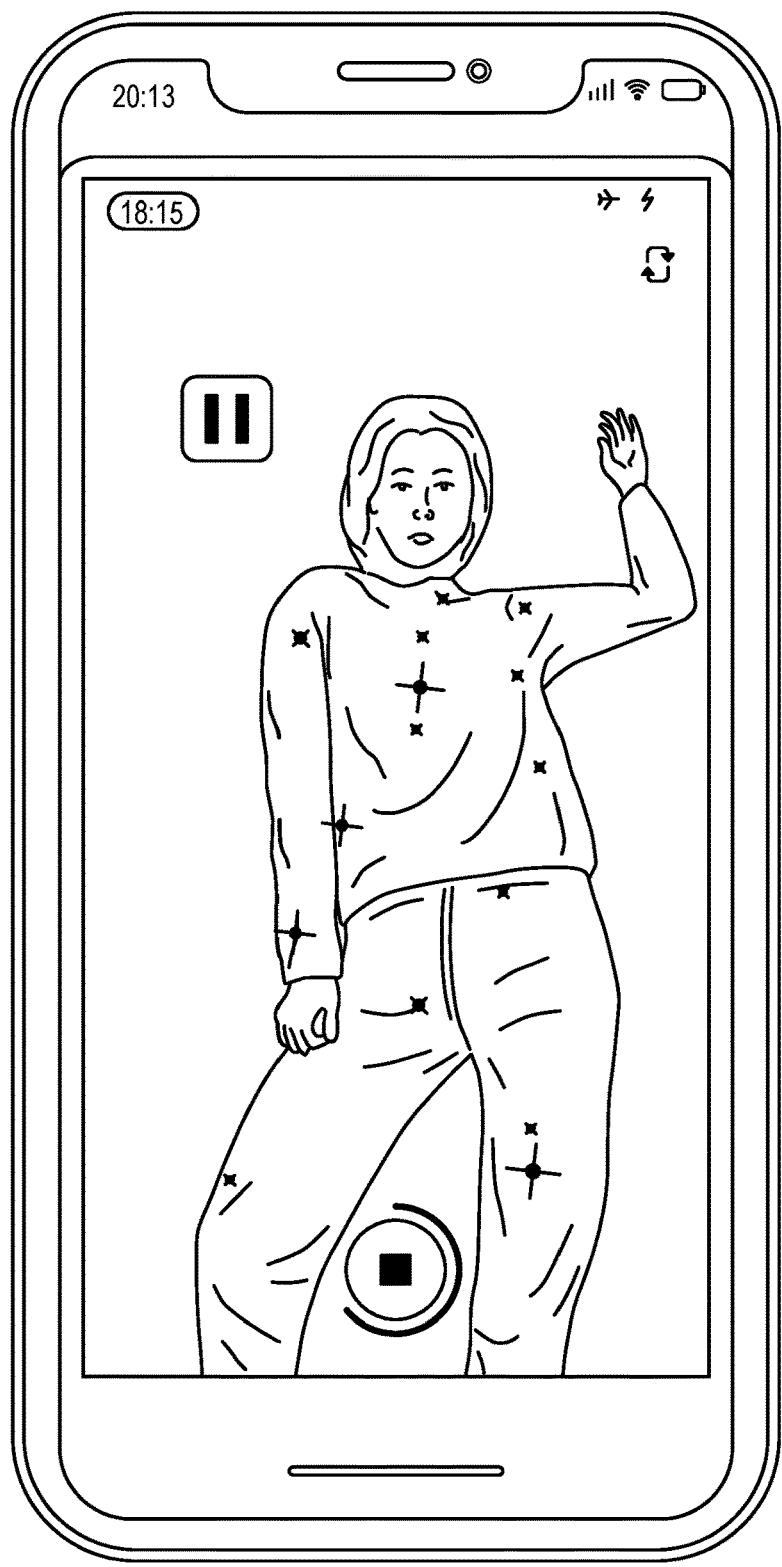
FIG. 10 is a diagrammatic representation of a camera view user interface displaying a touchless user selectable element configured to cause stopping of the recording, in accordance with some examples.
Figure 11:
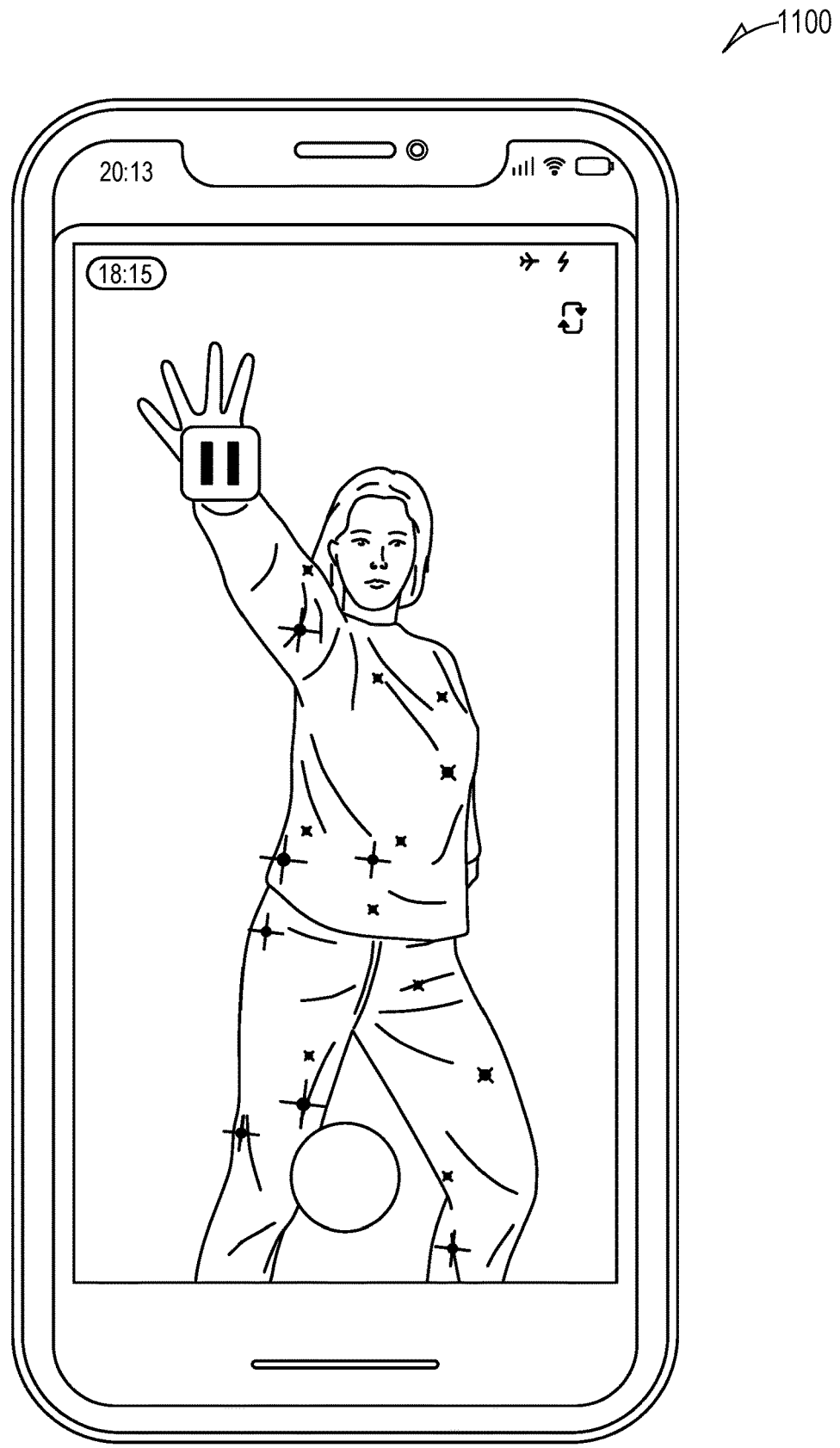
FIG. 11 is a diagrammatic representation of a camera view user interface displaying a collision of a hand object with the touchless user selectable element configured to cause stopping of the recording, in accordance with some examples.
Figure 12:
FIG. 12 is a diagrammatic representation of a camera view user interface displaying a touchless user selectable element configured to cause capturing of an image with a camera and another touchless user selectable element configured to cause replacing an item selection carousel with a color selection carousel, in accordance with some examples.
Figure 13:
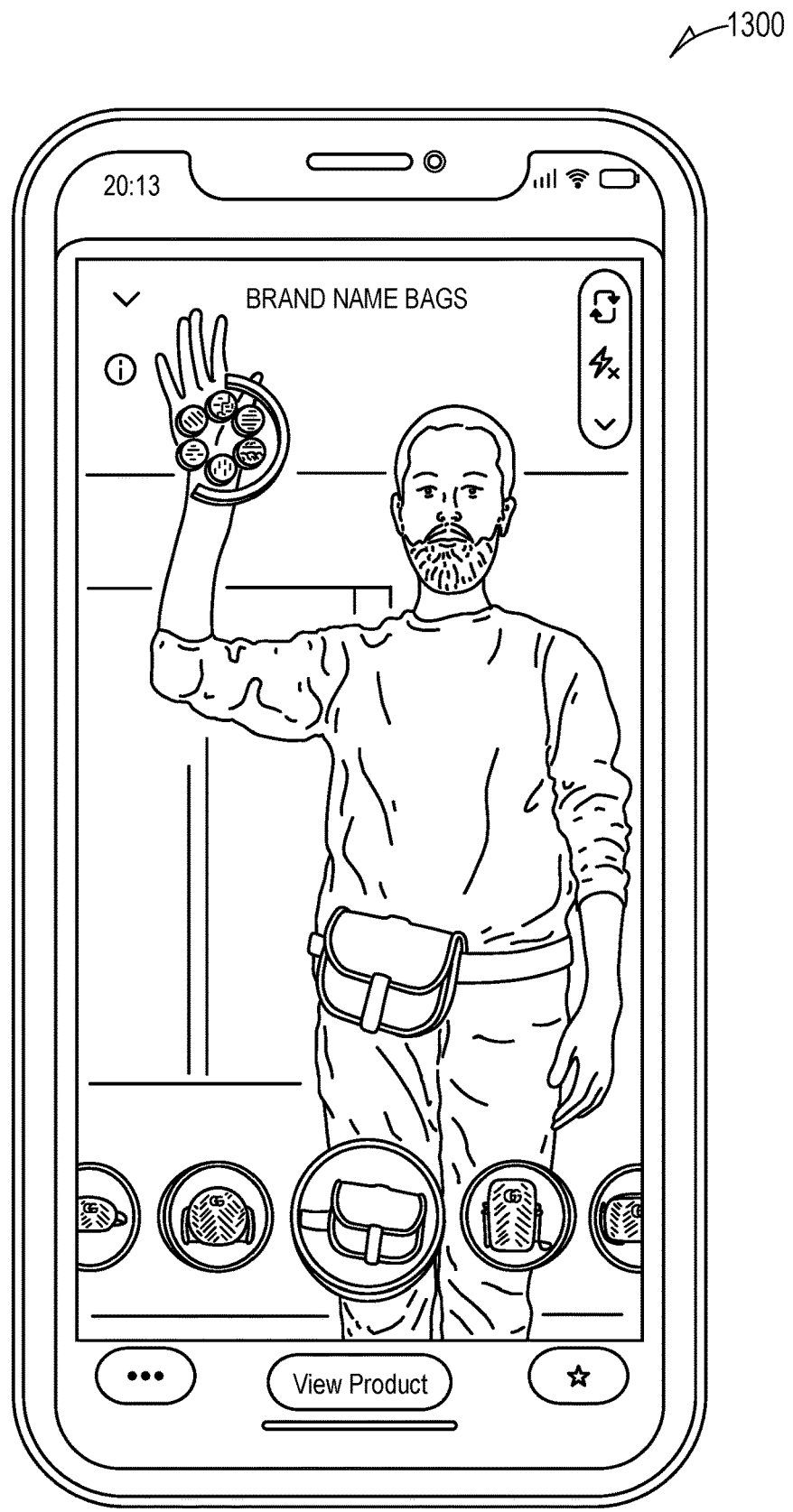
FIG. 13 is a diagrammatic representation of a camera view user interface displaying a collision of a hand object with the touchless user selectable element configured to cause replacing an item selection carousel with a color selection carousel, in accordance with some examples.
Figure 14:
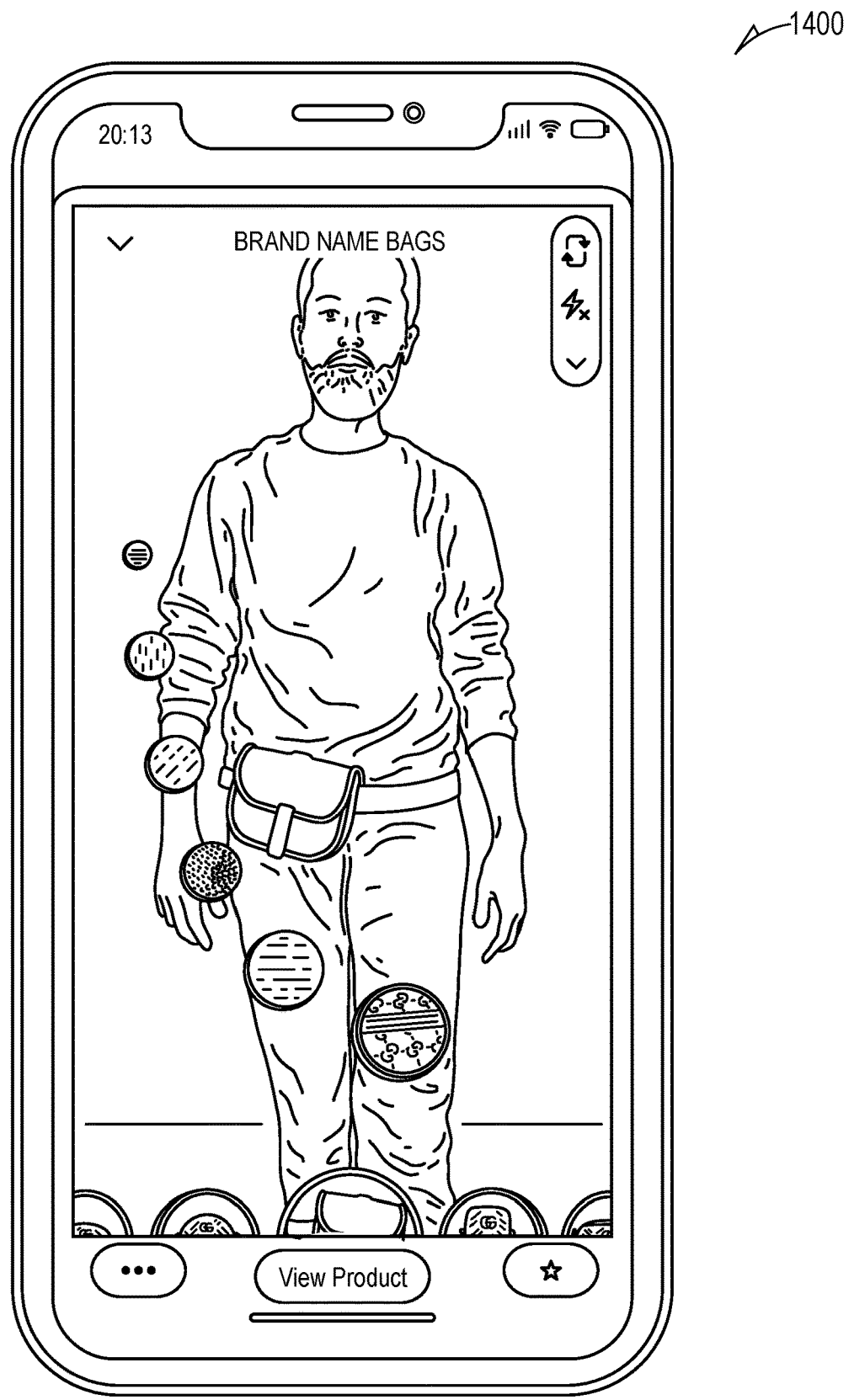
FIG. 14 is a diagrammatic representation of a camera view user interface displaying a visualization of replacing an item selection carousel with a color selection carousel, in accordance with some examples.
Figure 15:
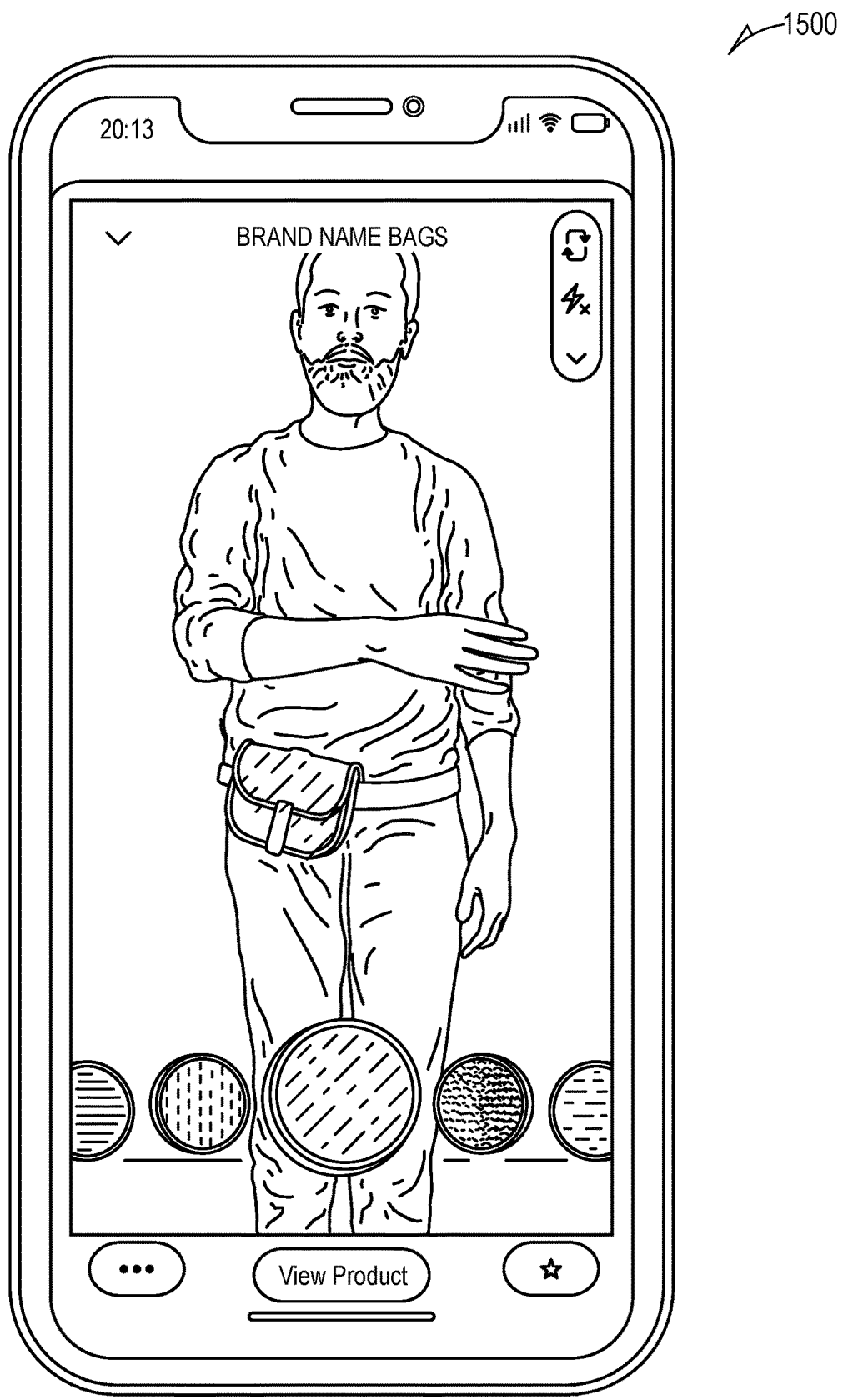
FIG. 15 is a diagrammatic representation of a camera view user interface displaying a color selection carousel that replaced the item selection carousel, in accordance with some examples.

FIG. 7-15 illustrate camera view screens presented on a display device while a user is engaging with AR experience provided by a body UI AR component. FIG. 7 is a diagrammatic representation of a camera view user interface 700 with a body UI AR component loaded, in accordance with some examples. FIG. 8 is a diagrammatic representation of a camera view user interface 800 displaying a touchless user selectable element configured to cause recording of a video, in accordance with some examples. FIG. 9 is a diagrammatic representation of a camera view user interface 900 displaying a collision of a hand object with the touchless user selectable element configured to cause recording of a video, in accordance with some examples. FIG. 10 is a diagrammatic representation of a camera view user interface 1000 displaying a touchless user selectable element configured to cause stopping of the recording, in accordance with some examples. FIG. 11 is a diagrammatic representation of a camera view user interface 1100 displaying a collision of a hand object with the touchless user selectable element configured to cause stopping of the recording, in accordance with some examples. FIG. 12 is a diagrammatic representation of a camera view user interface 1200 displaying a touchless user selectable element configured to cause capturing of an image with a camera and another touchless user selectable element configured to cause replacing an item selection carousel with a color selection carousel, in accordance with some examples. FIG. 13 is a diagrammatic representation of a camera view user interface 1300 displaying a collision of a hand object with the touchless user selectable element configured to cause replacing an item selection carousel with a color selection carousel, in accordance with some examples. FIG. 14 is a diagrammatic representation of a camera view user interface 1400 displaying a visualization of replacing an item selection carousel with a color selection carousel, in accordance with some examples. FIG. 15 is a diagrammatic representation of a camera view user interface 1500 displaying a color selection carousel that replaced the item selection carousel, in accordance with some examples.

Machine Architecture

Figure 17:
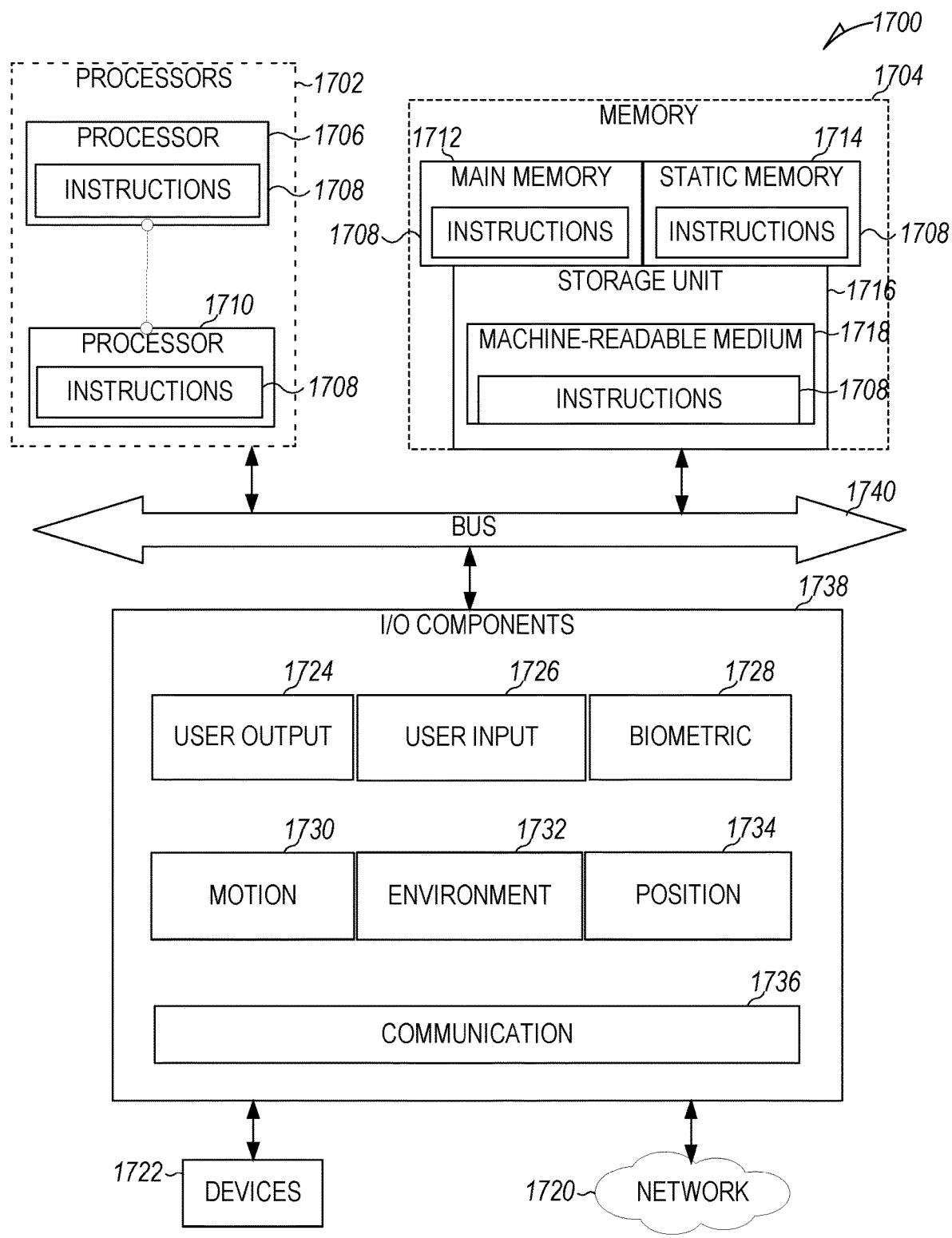
FIG. 17 is a diagrammatic representation of a machine in the form of a computer system within which a set of instructions may be executed for causing the machine to perform any one or more of the methodologies discussed herein, in accordance with some examples.

FIG. 17 is a diagrammatic representation of the machine 1700 within which instructions 1708 (e.g., software, a program, an application, an applet, an app, or other executable code) for causing the machine 1700 to perform any one or more of the methodologies discussed herein may be executed. For example, the instructions 1708 may cause the machine 1700 to execute any one or more of the methods described herein. The instructions 1708 transform the general, non-programmed machine 1700 into a particular machine 1700 programmed to carry out the described and illustrated functions in the manner described. The machine 1700 may operate as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1708, sequentially or otherwise, that specify actions to be taken by the machine 1700. Further, while only a single machine 1700 is illustrated, the term "machine" shall also be taken to include a collection of machines that individually or jointly execute the instructions 1708 to perform any one or more of the methodologies discussed herein. The machine 1700, for example, may comprise the client device 102 or any one of a number of server devices forming part of the messaging server system 108. In some examples, the machine 1700 may also comprise both client and server systems, with certain operations of a particular method or algorithm being performed on the server-side and with certain operations of the particular method or algorithm being performed on the client-side.

The machine 1700 may include processors 1702, memory 1704, and input/output I/O components 1738, which may be configured to communicate with each other via a bus 1740. In an example, the processors 1702 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1706 and a processor 1710 that execute the instructions 1708. The term "processor" is intended to include multi-core processors that may comprise two or more independent processors (sometimes referred to as "cores") that may execute instructions contemporaneously. Although FIG. 17 shows multiple processors 1702, the machine 1700 may include a single processor with a single-core, a single processor with multiple cores (e.g., a multi-core processor), multiple processors with a single core, multiple processors with multiples cores, or any combination thereof.

The memory 1704 includes a main memory 1712, a static memory 1714, and a storage unit 1716, both accessible to the processors 1702 via the bus 1740. The main memory 1704, the static memory 1714, and storage unit 1716 store the instructions 1708 embodying any one or more of the methodologies or functions described herein. The instructions 1708 may also reside, completely or partially, within the main memory 1712, within the static memory 1714, within machine-readable medium 1718 within the storage unit 1716, within at least one of the processors 1702 (e.g., within the Processor's cache memory), or any suitable combination thereof, during execution thereof by the machine 1700.

The I/O components 1738 may include a wide variety of components to receive input, provide output, produce output, transmit information, exchange information, capture measurements, and so on. The specific I/O components 1738 that are included in a particular machine will depend on the type of machine. For example, portable machines such as mobile phones may include a touch input device or other such input mechanisms, while a headless server machine will likely not include such a touch input device. It will be appreciated that the I/O components 1738 may include many other components that are not shown in FIG. 17. In various examples, the I/O components 1738 may include user output components 1724 and user input components 1726. The user output components 1724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1738 may include biometric components 1728, motion components 1730, environmental components 1732, or position components 1734, among a wide array of other components. For example, the biometric components 1728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1730 include acceleration sensor components (e.g., accelerometer), gravitation sensor components, rotation sensor components (e.g., gyroscope).

The environmental components 1732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1738 further include communication components 1736 operable to couple the machine 1700 to a network 1720 or devices 1722 via respective coupling or connections. For example, the communication components 1736 may include a network interface Component or another suitable device to interface with the network 1720. In further examples, the communication components 1736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1722 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1736, such as location via Internet Protocol (IP) geolocation, location via Wi-Fi® signal triangulation, location via detecting an NFC beacon signal that may indicate a particular location, and so forth.

The various memories (e.g., main memory 1712, static memory 1714, and memory of the processors 1702) and storage unit 1716 may store one or more sets of instructions and data structures (e.g., software) embodying or used by any one or more of the methodologies or functions described herein. These instructions (e.g., the instructions 1708), when executed by processors 1702, cause various operations to implement the disclosed examples.

The instructions 1708 may be transmitted or received over the network 1720, using a transmission medium, via a network interface device (e.g., a network interface component included in the communication components 1736) and using any one of several well-known transfer protocols (e.g., hypertext transfer protocol (HTTP)). Similarly, the instructions 1708 may be transmitted or received using a transmission medium via a coupling (e.g., a peer-to-peer coupling) to the devices 1722.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1704 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
    activating an augmented reality component in a camera view user interface of an application hosted at a device, the camera view user interface including output of a digital image sensor of a camera of the device;
    detecting anchor points assigned to respective segments of a person image in the camera view user interface;
    determining that the detected anchor points include a set of anchor points representing a full body of a person;
    in response to determining that the detected anchor points include the set of anchor points representing the full body of the person, causing display of a user selectable element in the camera view user interface, the user selectable element being engageable without physical contact with the device to trigger an action by the application using the augmented reality component; and
    in response to engagement of the user selectable element with a trigger segment of the person image, triggering the action.

2. The method of claim 1, wherein the detected anchor points include a first anchor point and a second anchor point, and wherein the first anchor point is assigned to a shoulder object or head object and the second anchor point is assigned to an elbow object, wrist object, hip object, knee object, or ankle object.

3. The method of claim 1, wherein the detected anchor points include a first anchor point and a second anchor point, and wherein the first anchor point is assigned to a shoulder object and the second anchor point is assigned to a hip object.

4. The method of claim 1, comprising detecting a body gesture resulting in the engagement of the user selectable element with the trigger segment of the person image without physical contact with the device.

5. The method of claim 1, comprising:
    detecting the engagement of the user selectable element with the trigger segment of the person image; and
    performing the action.

6. The method of claim 5, wherein the detecting the engagement of the user selectable element with the trigger segment of the person image comprises detecting a predetermined duration of the engagement.

7. The method of claim 1, wherein the trigger segment of the person image is a hand object in the person image.

8. The method of claim 1, wherein the action comprises causing commencement of recording of a video or capturing a still image with the camera of the device.

9. The method of claim 1, wherein the action comprises causing modification of virtual items displayed in the camera view user interface using the augmented reality component.

10. The method of claim 9, wherein the virtual items are virtual wearable items, and wherein the augmented reality component is configured to permit the person to try on the virtual wearable items.

11. The method of claim 1, wherein the set of anchor points includes every point from a full body indicator set of anchor points, the full body indicator set of anchor points representing the full body of the person.

12. The method of claim 1, wherein the detecting the anchor points assigned to the respective segments of the person image in the camera view user interface comprises executing a machine learning model trained using a training set of images, the machine learning model taking an image of a person as input and producing a set of anchor points as an output.

13. The method of claim 1, wherein the causing display of the user selectable element in the camera view user interface comprises tracking a position of a body segment object in the person image and displaying the user selectable element at a location in the camera view user interface determined based on the tracked position of the body segment object.

14. The method of claim 13, wherein the body segment object is a shoulder object.

15. The method of claim 1, comprising:
capturing a content item using the augmented reality component; and
communicating the captured content item to another device.

16. A computer system comprising:
one or more processors; and
a non-transitory computer readable storage medium comprising instructions that when executed by the one or more processors cause the one or more processors to perform operations comprising:
in a system that provides an application hosted at a device, configuring an augmented reality component to detect anchor points assigned to segments of a human body image;
activating the augmented reality component in a camera view user interface of the application hosted at the device, the camera view user interface including output of a digital image sensor of a camera of the device;
detecting anchor points assigned to respective segments of a person image in the camera view user interface;
determining that the detected anchor points include a set of anchor points representing a full body of a person;
in response to determining that the detected anchor points include the set of anchor points representing the full body of the person, causing display of a user selectable element in the camera view user interface, the user selectable element being engageable without physical contact with the device to trigger an action by the application using the augmented reality component; and
in response to engagement of the user selectable element with a trigger segment of the person image, triggering the action.

17. The computer system of claim 16, wherein the causing display of the user selectable element in the camera view user interface comprises tracking a position of a body segment object in the person image and displaying the user selectable element at a location in the camera view user interface determined based on the tracked position of the body segment object.

18. The computer system of claim 17, wherein the body segment object is a shoulder object.

19. The computer system of claim 16, wherein the system is a messaging system.

20. A machine-readable non-transitory storage medium having instruction data executable by a machine to cause the machine to perform operations comprising:
activating an augmented reality component in a camera view user interface of an application hosted at a device, the camera view user interface including output of a digital image sensor of a camera of the device;
detecting anchor points assigned to respective segments of a person image in the camera view user interface;
determining that the detected anchor points include a set of anchor points representing a full body of a person;
in response to determining that the detected anchor points include the set of anchor points representing the full body of the person, causing display of a user selectable element in the camera view user interface, the user selectable element being engageable without physical contact with the device to trigger an action by the application using the augmented reality component; and
in response to engagement of the user selectable element with a trigger segment of the person image, triggering the action.

* * * * *